July 1, 1941.                R. LAMBORN                2,247,814
                             POWER SYSTEM
                         Filed Oct. 21, 1939
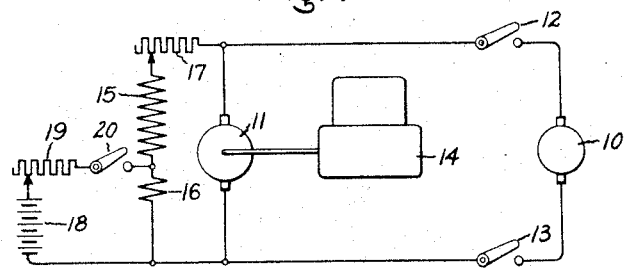
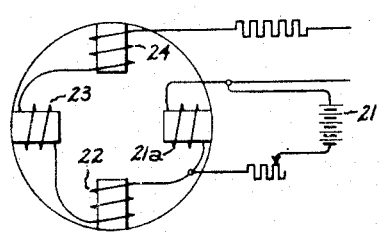
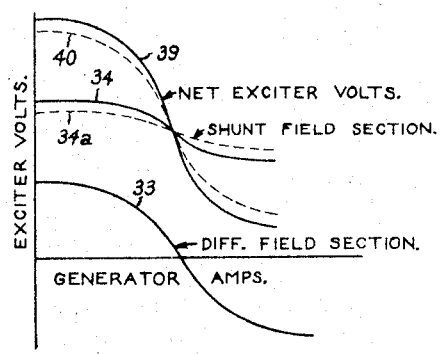
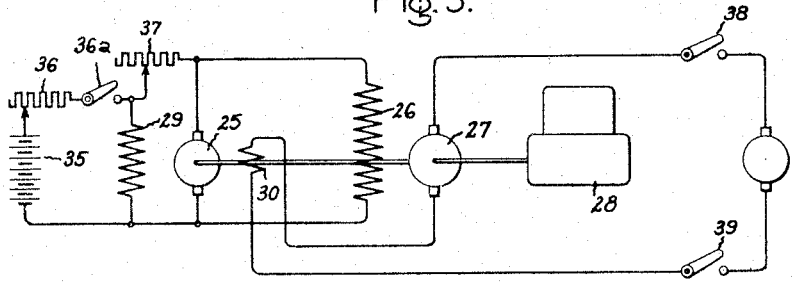
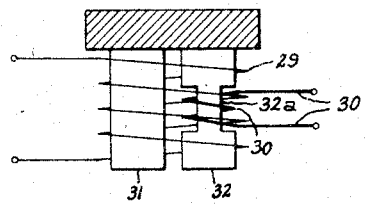
Inventor:
Richard Lamborn,
by Harry E. Dunham
His Attorney.

Patented July 1, 1941

2,247,814

UNITED STATES PATENT OFFICE 2,247,814

POWER SYSTEM

Richard Lamborn, Erie, Pa., assignor to General Electric Company, a corporation of New York Application October 21, 1939, Serial No. 300,640

2 Claims. (Cl. 171—313)

My invention relates to power systems, more particularly electric motor vehicle drive systems provided with a prime mover driven generator for supplying power to the motor and has for its object simple and reliable excitation means for the generator to give improved operating characteristics.

In carrying out my invention, I provide combined separate and self-excitation for the generator, the separate excitation being supplied from a storage battery or other source of essentially constant potential which is connected to at least a portion of the self-excited field. The battery may be recharged when the generator voltage builds up to a full value.

For a more complete understanding of my invention, reference should be had to the accompanying drawing, Fig. 1 of which is a diagrammatic view of a prime mover driven electric drive system embodying my invention; Fig. 2 is a fragmentary view showing a modified form of my invention; Fig. 3 is a diagram of a prime mover driven system having a special exciter for the generator; Fig. 4 is a fragmentary view partly in section showing a pole of the exciter while Fig. 5 consists of curves of the operating characteristics of the exciter shown in Fig. 4.

Referring to the drawing, Fig. 1 shows in diagrammatic form a simplified system such as used for example on railway locomotives and in which the direct current vehicle driving motor 10 is supplied with current from a direct current generator 11 which may be connected to the motor by means of switches 12 and 13. The generator 11 is driven by a suitable prime mover, shown as an internal combustion engine 14.

The generator 11 is provided with a shunt field winding 15 and with a separately excited and self-excited field winding 16 connected in series with the winding 15. These two windings or portions of windings are connected through a variable resistance 17 across the terminals of the generator 11. The winding 16 is therefore a portion of the total field winding. For separate excitation of the winding 16, a storage battery 18 is provided which is connected across the winding 16 through a variable resistance 19 and a switch 20, the connections being such that the field winding 16 is excited in the same direction from the battery as it is from the generator 11. The current supplied by the battery to the winding 16 is somewhat less than the full generator voltage self-excitation current in the two windings.

In the system of Fig. 1, the separately excited field switch 20 is opened and closed simultaneously with the line switches 12 and 13. This prevents, for one thing, unnecessary current drain from the battery when the switches 12 and 13 are open and the locomotive is at rest. Ordinarily the generator 11 will not build up on self excitation alone when operating at the normal engine idling speed of 50% or less of full speed, nor will the generator voltage build up either rapidly or slowly when the switches 12 and 13 are closed. The generator then has only a residual voltage. The critical speed for voltage build-up on self-excitation alone is appreciably higher than this idling speed. When the switch 20 is closed to establish the separate excitation, along with the closure of the switches 12 and 13, the inherent flux build up rate of the machine results in a smooth start of the motor 10 as the voltage of the generator 11 increases.

As the generator voltage increases, however, the increased current through the field winding 15 produced by the generator voltage increases the current flowing through the winding 16. Consequently, the voltage drop across the winding 16, by reason of the self-excitation current, increases and less current is supplied by the battery 18 to the winding 16. In other words, as the generator voltage increases, the generator automatically takes the characteristics of a self-excited generator.

At some predetermined generator voltage, which preferably is in the normal full running speed range, the voltage across the winding 16, by reason of the excitation current, is exactly equal to the voltage of the battery and the battery then supplies no current to the field winding 16. Upon further increase in the generator voltage, the voltage across the field 16 tends to become higher than the battery 18 and, consequently, current is supplied in a reverse direction to the battery so as automatically to charge the battery. This system, therefore, provides the initial separate excitation necessary for obtaining an effective idling speed voltage, the self-excitation automatically increasing with generator speed and voltage until the generator operates as a self-excited generator, with recharging of the battery.

It is contemplated that the winding 16 may be a separate winding wound on the same field poles as the winding 15. Also the winding 16 may be a portion of the total field winding. A similar excitation system, however, can be applied to one or more of the field windings of a multipolar generator. As shown in Fig. 2, the battery 21 is connected across a single field winding 21a of a four-pole generator having field windings 21a, 22, 23 and 24. In this system, as well as the system of Fig. 1, the battery tends to supply a small amount of reverse excitation to the other field windings 22, 23, and 24, but this excitation is comparatively negligible because of the high resistance of the circuit of the other field windings and the opposing generator voltage.

In Fig. 3, I have shown the application of my invention to a so-called split pole exciter 25 such as described and claimed in U. S. Patent No. 1,969,495 to John C. Barry, issued August 7, 1934. This exciter supplies excitation current for the field winding 26 of the generator 27 which is driven by the prime mover 28. The exciter is provided with a combined self and separately excited field winding 29 and with a series field winding 30 connected in circuit with the generator 27.

As shown in Fig. 4, each pole of the exciter 25 is provided with a laminated iron shunt field section 31 and with a laminated iron differential field section 32. The shunt field winding 29 encircles both of these pole sections while the series field winding 30 excites the differential field section 32 only. At some predetermined current value, the winding 30 which opposes the winding 29 exactly counterbalances the winding 29 on the pole section 32, and consequently, the voltage induced in the armature associated with the section 32 at that time is zero. Upon further increase in the generator current, the ampere turns due to winding 30 predominate and reverse the flux in the section 32 and consequently reverse the voltage induced in the armature by this section. This is indicated by the voltage curve 33 of Fig. 5.

Also the pole section 32 has a portion 32a of reduced cross section which becomes saturated quickly and in conjunction with the voltage characteristic 34 of the shunt section 31, results in the unusual but desirably shaped net exciter voltage curve 39. It will be understood that the curve 39 is the algebraic sum of the voltages of the curves 33 and 34.

In Fig. 3, the entire shunt winding 29 is separately excited by the battery 35 through a variable resistance 36 and a switch 36a. The entire winding 29 also receives self-excitation from the exciting armature 25 through the variable resistance 37. While not essential to the operation of the system, this will generally be found to be the simplest method of accomplishing the desired results. This system is in contrast with the systems disclosed in Figs. 1 and 2 where the separate excitation may be said to modify the basic self-excitation of the generator. In Fig. 3, on the other hand, the separate excitation is basic and the self-excitation modifies this basic separate excitation of the exciter.

The system of Fig. 3 has the advantage over systems with separate excitation only, such as disclosed in the aforesaid Barry patent, of providing a low generator voltage at idling speed. Consequently, when the switches 36a, 38 and 39 are closed to start the locomotive, less energy is applied to the traction motor and the acceleration is smoother without any objectionable starting jerk when the motor is connected to the generator. This jerky starting feature refers to the operation of the locomotive at minimum or idling Diesel engine speed which is frequently as much as 50% of full speed. At this low minimum or idling speed, the current delivered to the traction motors when they are at a standstill, with the system of the aforesaid Barry patent, has been found in some cases to be too great, producing too much tractive effort and jerky starting. By providing an appreciable amount of self-excitation in the exciter 25 at high speeds, in addition to the separate excitation, the separate excitation being correspondingly smaller, and by reason of this self-excitation decreasing as the exciter speed and exciter voltage decreases, the net exciter excitation is definitely lower at the idling speed.

In a typical application of Fig. 3, the winding 29 did not at any time become entirely separately excited nor was the self-excitation great enough to produce actual recharging of the battery. The rate of the discharge of the battery was simply reduced.

Another advantage of the system of Fig. 3 is that the shape of the exciter voltage curve 39 of Fig. 5, which is the sum of the voltages of curves 33 and 34, can be changed in its upper and lower portions without having recourse to changing the dimensions of the reduced cross section portion 32a or the air gap reluctance of the pole section 32. For example, by increasing the resistance 37 so as to decrease the self-excitation and slightly decreasing the resistance 36 to increase the separate excitation so as to maintain the same total excitation in the middle voltage range, the curve 34 may be made to take the dotted form 34a and the curve 39 consequently take the dotted form 40.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. In a power system for a self-propelled vehicle, in combination, a vehicle driving motor, a combustion engine arranged for operation at an idling speed and at a full speed, said idling speed being not higher than fifty per cent of said full speed, a direct current main generator driven by said engine provided with an armature and a field winding, an exciter generator for said field winding driven by said engine provided with an armature, and with a shunt field winding and a series field winding mounted on a plurality of poles, each of said poles comprising two magnet iron sections, one of which is excited by said shunt field winding only and the other of which is saturable and excited by both of said field windings, said series field winding being connected in circuit with said main generator and arranged to oppose said shunt field winding at predetermined low main generator currents and to reverse the field in said saturable section at predetermined higher main generator currents, a separate source of excitation for said shunt field winding, a variable resistance connected between said exciter shunt field winding and said exciter armature for varying the self-excitation supplied to said field winding, and a variable resistance between said separate source and said exciter shunt field winding for varying the separate excitation supplied to said shunt field winding, said resistances being adjusted thereby to adjust the excitation of said exciter shunt field winding from said separate source to give a predetermined low main generator voltage when said generators are being driven at said idling speed providing for smooth starting and acceleration of said motor and to provide for a relatively small amount of separate excitation when said generator is driven at said high speed for high speed operation of said motor.

2. In a power system for a self-propelled vehicle, in combination, an electric vehicle driving motor, a direct current generator connected to said motor provided with an armature and a normally self-excited shunt field winding, a combustion engine connected to drive said generator, said engine having a normal idling speed at which the self-excitation of said field winding is insufficient to produce voltage build-up of said generator and starting of said motor, said idling speed being 50 per cent or less of the full speed of said engine, a resistance connected between said field winding and said armature for decreasing the self-excitation of said field winding to provide a predetermined generator voltage when said engine is operating at said full speed, a storage battery having one terminal connected to one terminal of said field winding, a starting switch for said motor movable to a closed position independently of said engine to connect the other terminal of said storage battery to a selected point on said field winding and thereby effect starting of said motor when said engine is operating at said idling speed, and a resistance connected between said battery and said field winding for limiting to a predetermined value the exciting current supplied by said battery to said field winding when said starting switch is closed thereby to cause the voltage of said generator to build up at a predetermined rate when said engine is operating at said normal idling speed and thereby effect smooth starting and acceleration of said motor and the vehicle at a predetermined low rate when said engine is operating at said normal idling speed.

RICHARD LAMBORN.